Feb. 12, 1929.

R. B. LUCE 1,701,625

TIRE PATCH AND METHOD OF MAKING THE SAME

Filed Dec. 11, 1925

INVENTOR.
Robert B. Luce
BY
ATTORNEYS.

Patented Feb. 12, 1929.

1,701,625

UNITED STATES PATENT OFFICE.

ROBERT B. LUCE, OF ERIE, PENNSYLVANIA, ASSIGNOR TO CONTINENTAL RUBBER WORKS, OF ERIE, PENNSYLVANIA, A CORPORATION OF PENNSYLVANIA.

TIRE PATCH AND METHOD OF MAKING THE SAME.

Application filed December 11, 1925. Serial No. 74,799.

Tire patches have heretofore been formed by building up a plurality of plies of fabric. These have been built up usually with a large rectangular-shaped fabric as a base with superposed plies, each of smaller cross dimension in both directions so that the completed fabric stepped down in thickness from the center to both the sides and the ends. Such a structure is difficult of manufacture with resultant expense and further reduces the strength of the patch to a greater extent than is necessary in getting the tapered form. In the present invention the patch is formed by superposing a plurality of plies of fabric of varying widths and then cutting the assembled strip into patch lengths. Preferably the ends of these strips have the tapered edges of rubber thus avoiding the abrupt edge of fabric. Features and details of the invention will appear from the specification and claims.

The invention is illustrated in the accompanying drawings as follows:—

Figure 1:
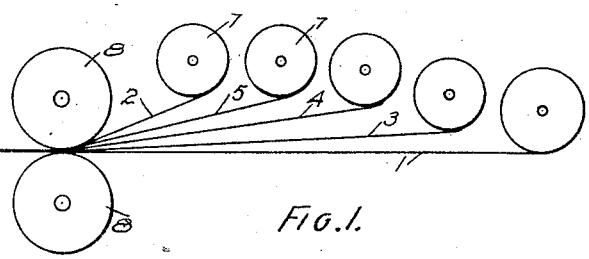

Fig. 1 shows a side elevation of an assembling apparatus.

Figure 2:
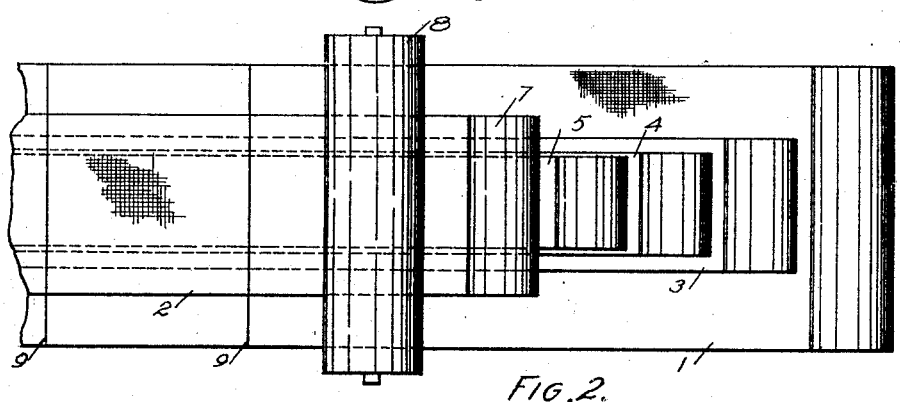

Fig. 2 a plan view of the same.

Figure 3:
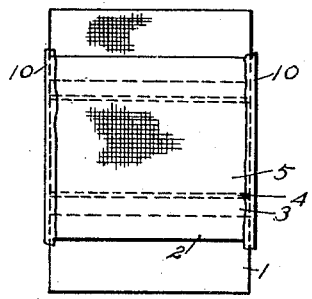

Fig. 3 a plan view of a patch in the process of manufacture.

Figure 4:
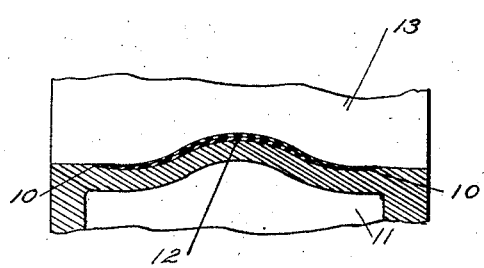

Fig. 4 a sectional view showing the manner of vulcanizing the patch.

Figure 5:
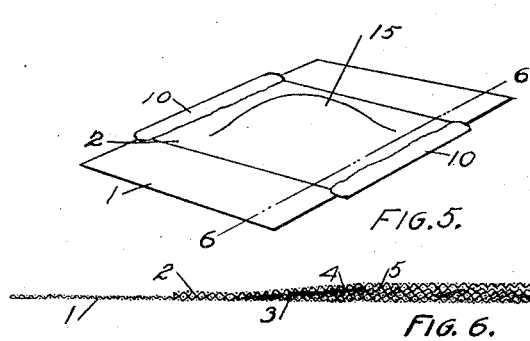

Fig. 5 a finished patch.

Figure 6:

Fig. 6 a sectional view on the line 6—6 in Fig. 5.

1 marks the wider or base ply of fabric, 2 the covering or upper ply of fabric which may have, if desired a skin coat of rubber, and 3, 4 and 5 are the intermediate plies of fabric of varying widths, thus tapering the thickness up from the sides.

The several plies of fabric are fed from rolls 7 to between rolls 8 by means of which a strip of assembled plies is formed. The strip is then cut up by any suitable cutting machine as at 9 to patch lengths. Preferably rubber strips 10 are then placed along the end edges of the ply at least over the plural portions of the same. Where the outer ply has a skin coat of rubber this may be extended beyond the ends and thus forms the rubber edge.

The assembled patch is then placed in the mold having a bottom 11 with a dome center 12 and the top mold 13 having a cavity conforming to the dome 12. The top portion of the mold is formed of fabric having elasticity so that when the mold is placed under pressure and during the vulcanizing process the rubber edges 10 through the flowing of the rubber feathers out and forms a tapered edge. The finished patch, therefore, comes out with the dome center 15 and the tapered rubber edges 10. The full strength of the fabric is in this way provided lengthwise of the patch. A tapered surface is formed entirely around the patch and the cost of manufacture is reduced very materially from the present manner of forming patches, the difference in the quantity of material used being more than compensated for by the difference in labor cost.

What I claim as new is:—

1. A tire patch having a plurality of fabric plies of the same length and of varying widths making the sides of the patch of gradually increasing thickness and end edges of rubber forming a tapered edge.

2. A tire patch having a plurality of fabric plies of the same length and of varying widths making the sides of the patch of gradually increasing thickness and an end edge of rubber overlapping the edge of the fabric and extending therefrom forming a tapered edge.

3. The method of forming tire patches which consists in assembling a plurality of strips of fabric of different widths to form a plural ply strip, cutting the strip into patch lengths with rubber extending along the edges of the end, and vulcanizing the patch and tapering the end by rubber flow.

4. The method of forming tire patches which consists in assembling a plurality of strips of fabric of different widths to form a plural ply strip, cutting the strip into patch lengths, placing rubber strips along the end edges and vulcanizing the patch and tapering the end by the flow of the rubber in said strips and along the edge.

5. The method of forming tire patches which consists in assembling a plurality of strips of fabric of different widths to form a plural ply strip, cutting the strip into patch lengths with rubber along its edge, vulcanizing the patch against a resilient surface and thus forcing a tapered form on the rubber edges.

In testimony whereof I have hereunto set my hand.

ROBERT B. LUCE.